Oct. 19, 1965  S. KMONK ET AL  3,212,980
RELEASABLE COUPLING MECHANISM
Filed Nov. 16, 1961  2 Sheets-Sheet 1
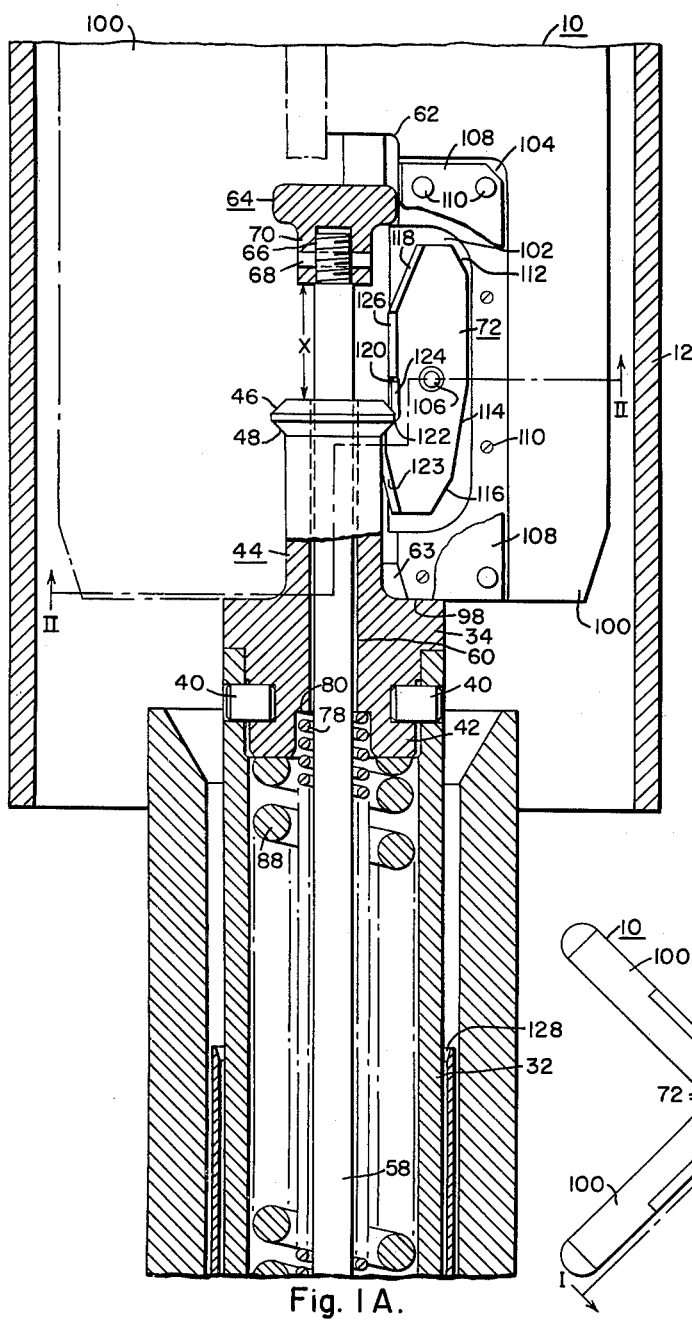
Fig. 1A.
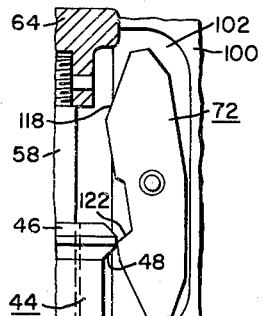
Fig. 4.
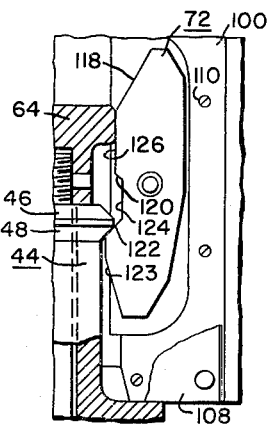
Fig. 5.
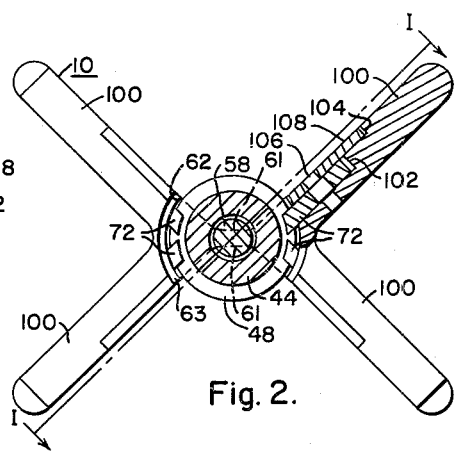
Fig. 2.
WITNESSES:
Bernard R. Gieguey
A. J. Santantonio
INVENTORS
Stanley Kmonk and
Thomas F. Widmer.
BY
ATTORNEY

United States Patent Office 3,212,980
Patented Oct. 19, 1965

3,212,980
RELEASABLE COUPLING MECHANISM
Stanley Kmonk, New Kensington, and Thomas F. Widmer, Monroeville, Pa., assignors to Westinghouse Electric Corporation, East Pittsburgh, Pa., a corporation of Pennsylvania
Filed Nov. 16, 1961, Ser. No. 152,747
16 Claims. (Cl. 176—36)

The present invention relates to a releasable coupling device for joining a driving member to a driven member, and more particularly to a novel releasable coupling device which couples the drive shaft in a bottom mounted control rod drive mechanism to its associated control rod in a nuclear reactor.

As this description proceeds, it will be apparent that the aforesaid releasable coupling device, as disclosed herein, will be readily adaptable to general usage. In this application, however, the automatically releasable coupling mechanism of the invention is described in connection with the coupling mechanism employed to couple the control rod drive shaft to its associated control rod in a nuclear reactor, particularly of the pressurized water type.

In the latter reactor, a core structure is frequently supported within a body of circulating coolant water. The core structure comprises a plurality of elongated fuel assemblies suspended in parallel fashion therein and a number of control rods suitably shaped to be inserted between selected groups of fuel assemblies. The fuel assemblies frequently comprise at least a portion of a fissionable isotope such as $U^{233}$, $U^{235}$ or $PU^{239}$, in which a controlled chain reaction is initiated, in a well known manner, by atomic reaction thereof with thermal neutrons. The chain reaction is controlled or terminated by adjustment of the aforesaid control rods, which are composed at least in part of thermal neutronic absorbing material, such as cadmium, boron, cobalt or their alloys.

When the control rods of a closed cycle liquid reactor are operated by drive mechanisms mounted at the bottom of the reactor vessel, it is necessary to allow removal of these control rods from the top of the reactor vessel during refueling for the purpose of inspecting and maintaining the aforementioned control rods. As it is desirable to have the control rod mechanically latched to the drive shaft during normal operation, some type of releasable coupling between the control rod and the drive shaft must be included.

In the case of top mounted control rod drive mechanisms, the coupling can be activated by a rod which passes upwardly through the center of the drive shaft to a release button. To disengage the control rod from the drive shaft, it is merely necessary to exert an upward pull on the disconnect button which in turn will cause the coupling unit to release the control rod from the drive shaft. A similar rod could be placed in the drive shaft of a bottom mounted control rod drive mechanism; but in order to gain access to this rod, the reactor vessel would have to be drained and a portion of the mechanism housing, sealably enclosing the control rod drive mechanism, would have to be removed. In addition, the thin cross section of the control rod does not permit installation of a disconnect rod from above the reactor. Therefore, no convenient means are available for adapting the present disconnect schemes to bottom mounted control rod drive mechanisms.

Accordingly, it is the general object of this invention to provide a novel automatically releasable coupling mechanism.

It is a more particular object of this invention to provide a positive mechanical coupling means which will unlatch the control rod from its associated drive shaft in a nuclear reactor only when the aforesaid control rod is in its fully bottomed position within the reactor core.

Another object of the invention is the provision of a novel locking arrangement adapted for use with a linearly movable coupling or latching arrangement.

Another object of the invention is the provision of a novel coupling arrangement, adapted to couple a linearly moving driving member to a linearly moving driven member.

Still another object of this invention is to provide a coupling arrangement which is releasable at only one position.

Briefly, the present invention accomplishes the above cited objects by incorporating a releasable coupling mechanism built into or associated with the upper portion of the drive shaft and the bottom portion of a control rod. In this example of the invention the drive shaft is located below the control rod and moves upwardly in a linear direction to force the control rod out of the reactor core. A set of pivoted fingers or latches are mounted in the lower portion of the control rod. In this example a total of four fingers are used, one for each portion of the cruciform-shaped control rod. The fingers have a plate-type shape; and the inner edge of each finger, which faces the drive shaft, has a first camming surface at the top, a second camming surface below the first camming surface, a flat portion between the first and second camming surfaces, a recess below the second camming surface, a third camming surface at the lower end of the recess, and a fourth camming surface at the lower end of the finger. At the top of the drive shaft are formed upper and lower camming surfaces. An actuator rod is slidably disposed through the center of the drive shaft and has a button or lock secured to the top of the rod. The button is located above the top of the drive shaft and has an outer diameter which is equal to the outer periphery of the camming surfaces at the top of the drive shaft. A spring, which is inserted over the rod and within the drive shaft, bears against the upper portion of the drive shaft and against a shoulder or collar on the lower portion of the rod. Thus, the spring forces the rod downwardly until the button at the top of the rod comes in contact with the top of the drive shaft. A sleeve is secured to the bottom of the rod by a cross pin, which passes radially through the rod and into the sleeve. The sleeve, in turn, contacts a stop collar which is held in a fixed position so as to stop the downward movement of the sleeve and rod.

In operation with the control rod fully out of the core, the button is held against the top of the drive shaft by the rod spring contained within the drive shaft. In this position the button or lock contacts the flat portion of each finger and prevents each finger from pivoting. The third camming surface of each finger, in turn, is engaged with the lower camming surface or catch formed at the top of the drive shaft and thus securely couples the control rod to the drive shaft. The control rod remains securely coupled to the drive shaft during its downward movement into the reactor core, until the control rod reaches its fully bottomed position within the reactor core. Near the end of the downward movement of the control rod, the sleeve secured to the bottom of the actuator rod contacts a permanently affixed stop collar, which stops the downward movement of the actuator rod and button secured to the top of the actuator rod. At this point, however, the control rod, the fingers, and the drive shaft continue their downward movement for a short distance before coming to rest. Therefore, the button is a short distance above the top of the drive shaft and has become disengaged from the fingers and permits the fingers to pivot.

The control rod is now in a position to be removed from the reactor core. As the control rod is raised the upper portion of each finger pivots inwardly and permits each finger to slide past the camming surfaces at the top of the drive shaft. As the control rod is raised further, the fingers pivot past the button in a similar manner to the one previously described. After the fingers have passed the button, the control rod is free to be completely raised out of the reactor core. During the installation of a control rod, the fingers are pivoted past the button and the camming surfaces at the top of the drive shaft by the fourth camming surface formed at the lower portion of each finger. Therefore, it is possible to remove a control rod and install another without gaining access to the releasable coupling mechanism.

Further objects, features and advantages of the invention become apparent as the following description proceeds, and features of novelty which characterize the invention will be pointed out in particularity in the claims annexed to and forming a part of this specification.

For a better understanding of the invention, reference may be had to the accompanying drawings, in which:

FIGURES 1A and 1B constitute a bi-partite, longitudinal, substantially sectional view taken along reference line I—I of FIG. 2 so as to show the releasable coupling mechanism of the invention and the related parts connecting the coupling unit to the drive shaft in accordance with the teachings of the invention;

FIG. 2 is a bottom plan view partly in cross section taken along reference line II—II of FIG. 1A so as to show the control rod and coupling unit in their normally engaged positions;

Figures 1B, 3:
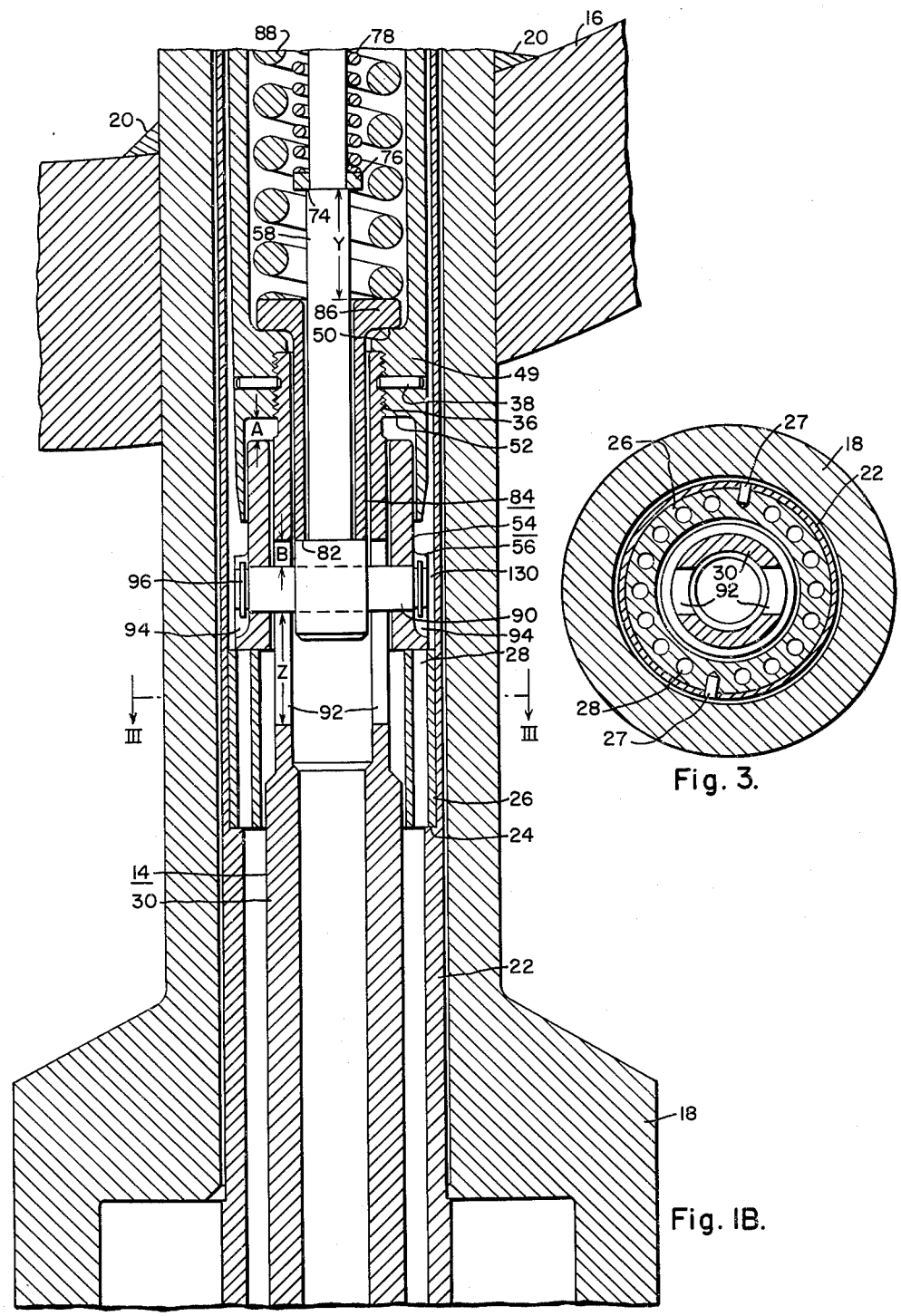
FIG. 3 is a cross sectional view taken along reference line III—III of FIG. 1B and shows the construction of the upper portion of the drive shaft, the stop collar and adapter housing enclosing the drive shaft and stop collar.

FIG. 4 is an elevation view partly in section of a small part of the upper portion of FIG. 1A with the finger shown in a true elevation and shows the finger in a pivoted position as it passes by the camming surfaces at the top of the drive shaft when the control rod is being raised or lowered from above while the drive shaft remains in its fully bottomed position; and FIG. 5 is another view similar to FIG. 4 except that the finger is now shown in a locked position after the control rod has been raised a short distance by the drive shaft.

Referring to FIGS. 1 to 3 of the drawings, and more particularly to FIG. 1, the exemplary form of the invention shown therein is adapted for use, in this example, with a driven member or control rod 10 having an offset, cruciform cross section (FIG. 2), which is supported for movement within a shroud tube 12 of a generally tubular cross section by a generally tubular driving member or drive shaft 14 with its associated, secured components. The shroud tube 12 extend upwardly to the bottom of the reactor core and partially supports a lower core supporting plate (not shown).

For the purpose of this specification, the terms "tubular, tubularly shaped and tubular member" are definitive not only of a pipe-like structure having a cross section defined by two concentric circles but are also specifically intended to include structure having other cross sectional shapes. In their broad aspects, the aforementioned terms include any member or structure having an opening extending longitudinally through at least a portion thereof.

FIG. 1 of the drawings shows the drive shaft 14 and its related components in relation to the control rod 10, which is in its scrammed or fully inserted position within the reactor core (not shown). A known form of control rod drive mechanism (not shown), which drives its associated drive shaft 14, is located below and external to the reactor vessel, a portion of which is shown as indicated by reference character 16. A control rod drive mechanism (not shown) is hermetically secured to an adapter 18, which extends upwardly through the bottom of the reactor vessel 16 to a point a short distance within the reactor vessel 16. The adapter 18 is also sealably secured to the reactor vessel 16 by a weld 20. A tubular stationary dashpot liner 22 is disposed within the inner periphery of the adapter 18. The bottom of the liner 22 is secured to the control rod drive mechanism (not shown) and extends upwardly within the adapter 18 to a point a short distance below the top of the adapter 18. A shoulder 24 is formed on the inner periphery of the liner 22 at approximately its mid-point. A stop collar 26 is then press fitted into place on the shoulder 24 of the liner 22. The stop collar 26 is fixed to the liner 22 by at least one welded pin 27 (FIG. 3), which is radially inserted through the liner 22 and into the stop collar 26. A plurality of ports 28 are drilled longitudinally through the wall thickness of the stop collar 26.

The drive shaft 14 or the upper portion of the main drive shaft (not shown) comprises a drive shaft extension 30, a dashpot piston 32 and an end cap 34, all of which are secured in a longitudinal alignment with one another and are located coaxially with respect to the adapter 18. Therefore, the extension 30, piston 32, and cap 34 move as a unit. The tubular drive shaft extension 30 has its lower end secured to the main drive shaft (not shown) by any well known means such as threading or welding and extends upwardly within the adapter 18 to the reactor vessel 16. The tubular dashpot piston 32 has its lower end secured to the top of the drive shaft extension by any well known means such as by threading, as indicated by reference character 36 and by the use of radial pins 38, and extends upwardly within the adapter 18 to a point slightly above the adapter 18. The dashpot piston also has an inward longitudinal taper from the top to its bottom. The disc shaped end cap 34 is then secured to the top of the dashpot piston 32 by any well known means, such as the use of at least one radial pin 40. On the lower side of the end cap 34 there is formed an annulus 42; and on the upper side of and integral with the end cap 34 there is formed a tubular protrusion 44, which extends into the lower portion of the control rod 10. At the top of the protrusion 44 there are formed an upper camming surface 46 and a lower camming surface 48.

At a short distance above the lower end of the dashpot piston 32 is formed a thickened portion 49, which extends radially inwardly to form an upper shoulder 50 and a lower shoulder 52. A stop sleeve 54, having a thickened portion 56 at its lower end, contacts the top of the stop collar 26 and fits slidably between the drive shaft extension 30 and the lower end of the dashpot piston 32. The thickened portion 56 also has an outer diameter of sufficient size to cover the ports 28. A gap A is also formed between the top of the stop sleeve 54 and the lower shoulder 52, as explained hereinafter. An actuator rod 58 extends upwardly from within the upper portion of the drive shaft extension 30, through the dashpot piston 32, through an axial opening 60 formed in the end cap 34 and the protrusion 44, and extends into a cutaway portion 62 (FIG. 2) in the lower portion of the cruciformly shaped control rod 10. The cross sectional area which has been cutout is shown between the dotted lines indicated by reference character 61 (FIG. 2). A button 64 is threaded to the top of the actuator rod 58, as indicated by reference character 66. The lower portion of the button 64 is necked, as indicated by reference character 70, in order to provide space into which a finger 72, to be described hereinafter, is permitted to pivot. A pin 68 is then radially inserted through the neck 70 of the button 64 and through the actuator rod 58 in order to fix the button 64 to the actuator rod 58. Unless otherwise stated the outer ends of all pins used in this invention are welded in place in order to prevent the pin from becoming dislodged. The diameter of the cutaway portion 62 in the control rod 10 is sufficiently large to permit the button 64 and the camming surfaces 46 and 48 to slide therein. The lower end of the cutaway portion 62 is also beveled, as indicated by reference character 63, so as to guide the control rod 10 past the button 64 and protrusion 44 whenever the control rod 10 is initially lowered into place on the drive shaft 14.

An upper shoulder 74 is formed on the actuator rod 58 approximately two-thirds of the distance from the top of the actuator rod 58. A collar 76 is slidably placed over the top of the actuator rod 58 and seated against the shoulder 74. A rod spring 78 is then slidably inserted over the upper portion of the actuator rod 58. The rod spring 78 is contained by the collar 76 and a recess 80 formed between the actuator rod 58 and the annulus 42 at the lower end of the end cap 34. The rod spring 78 thus urges the actuator rod 58 in a downwardly direction at all times. A lower shoulder 82 is also formed at the lower end of the actuator rod 58. A bushing 84, having a flange 86 at its upper end, is slidably positioned between the outer periphery of the actuator rod 58 and the inner periphery of the drive shaft extension 30, so that the bottom of flange 86 contacts the upper shoulder 50 of the dashpot piston 32 and simultaneously contacts the lower shoulder 82 formed on the actuator rod 58. A dashpot spring 88 is positioned between the rod spring 78 and the inner periphery of the dashpot piston 32. The dashpot spring 88 is contained between the annulus 42 of the end cap 34 and the flange 86 of the bushing 84, so that the dashpot spring 88 is always urging the bushing 84 in a downward direction. A cross pin 90 is radially inserted through the thickened portion 56 of the stop sleeve 58, through longitudinal slots 92 formed in the upper portion of the drive shaft extension 30, and through the lower portion of the actuator rod 58. A longitudinal, screwdriver-size slot is then centrally cut into each of the thickened portion 56 and into each end of the cross pin 90, as indicated by reference character 94. A vertical pin 96 is then placed in each end of the cross pin 90 and welded to the cross pin 90. Each end of pin 96 extends slightly beyond the outer diameter of the cross pin 90; thus the cross pin 90 cannot become displaced nor is it free to rotate.

A gap B from the top of each slot 92 to the top of the cross pin 90 is slightly greater than the gap A previously described. In this example of the invention gap A is equal to one-quarter of an inch. A gap Z from the bottom of the cross pin 90 to the bottom of the slot 92 in this example of the invention is equal to 1¼". A gap Y also is formed between the shoulder 74 and the top of flange 86; and a gap X occurs between the bottom of button 64 and the top of the protrusion 44. Gap Y is of substantially the same length as gap Z. However, gap X is slightly less than gaps Y and Z to ensure that the button 64 seats against the top of the actuator rod 58 whenever the drive shaft 14 raises the control rod 10.

The control rod 10, when in its fully bottomed position within the reactor core as shown in FIGS. 1A and 1B, rests on shoulder 98 of the end cap 34. The control rod 10, in this example of the invention, has four offset blades 100. At least one finger 72 must be used as a means for coupling the control rod 10 to the drive shaft 14. In this example of the invention, one finger 72 is used for each blade 100 of the control rod 10. The finger 72, which is of a plate-type construction, is pivotally positioned in an inner recess 102 (FIG. 2) by a pivot pin 106, which extends radially through the blade 100, through the finger 72, and through a keeper plate 108. The keeper plate 108 fits into an outer recess 104 and is held in position by a plurality of welded pins or rivets 110. The pivot pin 106 is held in position by any well known means such as by welding. The back edge of finger 72 has been beveled at three places, as indicated by reference characters 112, 114 and 116 in order to allow the finger 72 to pivot within the inner recess 102. The inner edge or edge opposite the back vertical edge of the finger 72 has a first camming surface 118 at the top, a second camming surface 120 at approximately the horizontal center line of the finger 72, a flat portion or shoulder 126 between the first and second camming surfaces 118 and 120 respectively, a recess 124 below and adjacent the second camming surface 120, a third camming surface 122 at the lower end of recess 124 and a fourth camming surface 123 at the lower end of finger 72. In this example of the invention the innermost point of the camming surfaces 118 and 120 are in vertical alignment; whereas, camming surfaces 122 and 123 are further inwardly as shown in FIG. 5. The recess 124 is provided to receive the upper and lower camming surfaces 46 and 48, respectively, of the protrusion 44.

*Operation*

In operation, with the control rod 10 in its fully bottomed position as shown in FIGS. 1A and 1B, the control rod 10 is resting on the shoulder 98 of end cap 34. First, the main drive shaft (not shown) within the control rod drive mechanism (not shown) is actuated in a vertically upward direction in order to raise the control rod out of the reactor core (not shown). The main drive shaft, which is secured to the bottom of the drive shaft 14, then raises simultaneously the drive shaft 14, which comprises the drive shaft extension 30, the dashpot piston 32, the end cap 34, and the protrusion 44 with its camming surfaces 46 and 48, as all are securely fixed to each other. The control rod 10, which is resting on the shoulder 98 of end cap 34, is also raised simultaneously with the upward movement of the drive shaft 14. The finger 72, which is pivotally fixed to the control rod 10, is also raised simultaneously with the control rod 10. During this operation, the positions of the protrusion 44 and the finger 72 remain constant. As the control rod 10 is raised, the gap X is completely closed and gaps Y and Z are substantially closed. When gap X has been closed, the outer periphery of button 64 contacts a shoulder 126 (FIG. 5) and prevents any pivotal movement by the finger 72. During the time that gap X is being closed, rod spring 78 holds the button 64 in a stationary position. This is accomplished by the fact that the rod spring 78 urges the collar 76 in a downwardly direction against the upper shoulder 74 on the actuator rod 58. The actuator rod 58, in turn, is urged against the cross pin 90 which in turn forces the stop sleeve 54 against the stationary stop collar 26. It is also to be noted that as the dashpot piston 32 is raised, the upper shoulder 50 of dashpot piston 32 simultaneously raises the bushing 84 and the dashpot spring 88.

When gap X has been closed, the bottom of the button 64 contacts the top of protrusion 44. Simultaneously, gaps A and B have been increased by the length of gap X. At this point the protrusion 44 forces the button 64, the actuator rod 58, and the cross pin 90 in an upwardly direction. The cross pin 90 simultaneously causes stop sleeves 54 to move in an upwardly direction. The aforementioned moving parts now move in unison with the control rod 10 coupled to the drive shaft 14 in a locked position, as the button 64 prevents the disengagement of lower camming surface 48 of protrusion 44 from the third camming surface 122 of finger 72. With the control rod 10 in a partially raised or fully raised position, the control rod 10 follows the drive shaft 14 during a controlled insertion of the control rod 10 into the reactor core (not shown) or during a scram, because the control rod 10 is coupled in a locked position to the drive shaft 14 as previously described. Therefore, the control rod 10 cannot become lodged within the reactor core (not shown) and cannot become uncoupled from the drive shaft 14 so as to permit the downward movement of the drive shaft 14 during a scram without the control rod 10.

Thus, the main drive shaft (not shown), which is secured to the drive shaft 14, can be utilized to dislodge a stuck control rod 10. In addition, the position of the control rod 10, which is indicated by a position indicator actuated by the main drive shaft (not shown), is reliable, as the control rod 10 cannot become uncoupled from the drive shaft 14 which in turn is secured to the main drive shaft.

During a scram with the control rod withdrawn from the reactor core, the control rod 10 and the main drive shaft (not shown) drop in unison by the force of gravity. As the main drive shaft (not shown) descends, the liquid contained within the control rod drive mechanism (not shown) will be displaced and will be forced in an upwardly direction through the ports 28 of the stop collar 26 and past the inner periphery of the upper portion of the dashpot liner 22. As the control rod 10 nears the end of its descent, the dashpot piston 32 enters the upper portion of the dashpot liner 22. The displaced liquid flowing upwardly now passes through an opening 128 between the outer periphery of the dashpot piston 32 and the inner periphery of the dashpot liner 22. As the displaced fluid then must pass through the restricted opening 128, a drag is created which reduces the speed of descent of the control rod 10 and all components connected to the control rod 10. The amount of drag thus produced increases as the dashpot piston 32 continues its downward movement within the dashpot liner 22, because the taper on the dashpot piston 32, as previously described, continually reduces the restricted opening 128. Initial drag, however, is created when the thickened portion 56 of stop sleeve 54 enters the dashpot liner 22, because a restricted opening 130 is formed between the outer periphery of the thickened portion 56 and the inner periphery of the dashpot liner 22 as the thickened portion 56 descends along the dashpot liner 22. Thus the upward displacement of the fluid is retarded by the aforementioned restricted opening 130 and thus creates a drag which reduces the speed of descent of the control rod 10. The drag is increased to an even greater extent, as the thickened portion 56 reduces and finally stops the flow of displaced fluid upwardly through the ports 28.

The descent of the stop sleeve 54 is terminated when the bottom of the stop sleeve 54 comes in contact with the rigidly fixed stop collar 26. This, in turn, stops the descent of the cross pin 90, the actuator rod 58, the collar 76, the rod spring 78, and the button 64. However, all other descending components continue with their descent; and gap A is reduced by the length of gap X, as the lower shoulder 52 approaches the top of the stop sleeve 54. The descent of the bushing 84 is next terminated, when the bottom of the bushing 84 comes in contact with the lower shoulder 82 of the actuator 58 which had previously come to rest. The dashpot piston 32 and all other descending components secured to the dashpot piston terminate their downward descent when the lower shoulder 52 of the dashpot piston 32 comes in contact with the top of the stop sleeve 54. However, the force of impact between the lower shoulder 52 and the top of the stop sleeve 54 is materially reduced, as the dashpot spring 88 is compressed an amount equal to the gap A by the descent of the end cap 34 which causes the dashpot spring 88 to be compressed against the flange 86 of bushing 84 which had been previously stopped as described hereinbefore. Since gap B is slightly larger than gap A, the top of longitudinal slot 92 in the drive shaft extension 30 does not come in contact with the cross pin 90. As the dashpot spring 88 is sufficiently strong to maintain the weight of the control rod 10, the main drive shaft (not shown), and the drive shaft 14 together with all components secured thereto, the dashpot piston 32 is returned to its original position as shown in FIGS. 1A and 1B so as to obtain the gap A again.

*Control rod removal*

In order to remove the control rod 10 without disturbing the control rod drive mechanism (not shown) or without having to drain the fluid from the reactor, the top of the control rod 10 is engaged by any suitable remote handling tool well known in the art. The control rod 10 is then lifted out of the reactor core (not shown) by the automatic uncoupling of the control rod 10 from the protrusion 44 as described hereinafter. As the control rod 10 is raised, the lower camming surface 48, which is engaged with the third camming surface 122 of finger 72, forces the finger 72 to pivot in a counterclockwise direction as shown in FIG. 4 and permits the third camming surface 122 to pass by the outer periphery of camming surfaces 46 and 48. As the control rod 10 is lifted further, the first camming surface 118 of finger 72 comes in contact with the button 64. The button 64 then causes the finger 72 to pivot in a clockwise direction until the finger 72 attains its vertical position. Simultaneously during this lifting interval the fourth camming surface 123 has passed by the camming surfaces 46 and 48. As the control rod 10 is raised further, the button 64 comes in contact with the third camming surface 122 and causes the finger 72 to again pivot in a counterclockwise direction. This permits the third camming surface 122 to pass by the button 64, at which time the control rod 10 can be lifted completely out of the reactor core (not shown) since the control rod 10 is no longer coupled to the drive shaft 14.

During the insertion of the control rod 10 into the reactor core (not shown) the fourth camming surface 123 of the finger 72 first comes in contact with the button 64. The button 64 then causes the finger 72 to pivot in a counterclockwise direction and permits the third and fourth camming surfaces 122 and 123 respectively to pass by the button 64. The button 64 then engages the second camming surface 120 and forces the finger 72 to rotate in a clockwise direction into a vertical position. This permits the shoulder 126 to pass by the button 64. As the control rod 10 is lowered into its fully inserted position within the reactor core (not shown), the outer peripheries of the camming surfaces 46 and 48 enter the recess 124. At this point, the finger 72 may remain in a pivoted position counterclockwise to its vertical axis. However, when the control rod 10 is first raised by the drive shaft 14, the first camming surface 118 will engage the button 64 and cause the finger 72 to pivot in a clockwise direction into a vertical position as shown in FIG. 1A. As the control rod 10 is raised further, it becomes coupled and locked to the protrusion 44 as previously described. Therefore, the control rod 10 is mechanically locked to the drive shaft 14 in all operational positions of the control rod, except for the one instance when the control rod 10 is in its fully inserted position.

What is claimed as new:

1. A releasable coupling mechanism comprising a driving member movable along a prescribed path, a driven member disposed adjacent said driving member for movement along said path, at least one latch pivotally secured to said driven member, cooperating means on said driving member and on said latch for releasably engaging said latch to said driving member, means on said driving member for locking said latch in an engaged position with said driving member, a stop member located a predetermined position along said path, and an actuator linkage engaging said locking means and also engageable with said stop member at said predetermined position to disengage said locking means.

2. A releasable coupling mechanism comprising a driving member, a driven member disposed above and adjacent said driving member for movement therewith, at least one latch pivotally secured to said driven member, cooperating means on said latch and on said driving member for releasably engaging said latch to said driving member, means for locking said latch in an engaged position with said driving member, an enclosure surrounding said driving member and said driven member, and means within said enclosure for automatically producing a predetermined relative movement between said locking means and said latch to disengage said locking means from said latch at a predetermined position of said driving member.

3. A releasable coupling mechanism comprising a driving member movable along a prescribed path, a driven member disposed adjacent said driving member for movement along said path, a stop element at a predetermined position along said path, at least one latch pivotally secured to one of said members, a catch on said other member, a locking element disposed adjacent one of said members, and an actuator slidably disposed in said last mentioned member and affixed to said locking element, said actuator being positioned to engage said stop element at said predetermined position to engage and to disengage said locking element and said latch to prevent and to permit disengagement of said catch and said latch, respectively.

4. A releasable coupling mechanism comprising a driving member movable along a prescribed path, a driven member disposed adjacent said driving member for movement along said path, a stop member at a predetermined position along said path, at least one latch pivotally secured to said driven member, a catch formed at the end of said driving member and adjacent said driven member, a lock disposed on said catch, and a lock actuator slidably disposed through a portion of said driving member adjacent said driven member, said lock actuator affixed to said lock and positioned to engage said stop member at said predetermined position to engage and to disengage said lock and said latch to prevent and to permit disengagement of said catch and said latch, respectively.

5. A releasable coupling mechanism comprising a tubular drive shaft having a shoulder and tubular protrusion at one end of said drive shaft, an actuator rod slidably disposed in said drive shaft and extending through said protrusion, a button secured to the end of said rod and exterior to said protrusion, a driven member disposed adjacent the drive shaft shoulder and in longitudinal alignment with said drive shaft, a cut-away portion at the end of said driven member adjacent said drive shaft for receiving said button and said protrusion, at least one finger pivotally affixed to said driven member adjacent said cut-away portion, one portion of said finger being pivotally engageable with said protrusion and another portion of said finger being engageable with said button so as to prevent any pivotal movement of said finger when so engaged, said engaged finger being utilized to move said driven member in one direction and said shoulder on said drive shaft being utilized to move said driven member in the other direction.

6. A releasable coupling mechanism comprising a tubular drive shaft having a shoulder and tubular protrusion at one end of said drive shaft, an actuator rod slidably disposed in said drive shaft and extending through said protrusion, a button secured to the end of said rod and exterior to said protrusion, a driven member disposed adjacent the drive shaft shoulder and in longitudinal alignment with said drive shaft, a cut-away portion at the end of said driven member adjacent said drive shaft for receiving said button and said protrusion, at least one finger pivotally affixed to said driven member adjacent said cut-away portion, one portion of said finger being pivotally engageable with said protrusion by means of cooperating surfaces on said finger and said protrusion, another portion of said finger being engageable with said button so as to prevent any pivotal movement of said finger when so engaged, means for producing relative movement between said finger and said button to permit pivotal movement of said finger, camming surfaces on said finger for guiding said finger into engagement and disengagement with said protrusion and said button when said driven member is coupled and decoupled relative to said drive shaft respectively.

7. In a neutronic reactor having a plurality of fuel assemblies and a plurality of control rods each having at least one blade inserted among selected groups of said fuel assemblies, a releasable coupling mechanism for each of said control rods and comprising a drive shaft, said drive shaft being disposed below and adjacent said control rod blade for movement therewith, a latch pivotally and permanently secured to said control rod blade, cooperating means for engaging said latch to one end of said drive shaft, means for locking said latch in an engaged position with said drive shaft, an enclosure surrounding said drive shaft and said control rod, and means within said enclosure for automatically disengaging said locking means only when said control rod is in a fully inserted position among said fuel assemblies.

8. In a neutronic reactor having a plurality of fuel assemblies and a plurality of control rods insertable among selected groups of said fuel assemblies, a releasable coupling mechanism for each of said control rods and comprising a drive shaft movable along a prescribed path, at least one latch pivotally secured to each of said control rods, each control rod being disposed adjacent to its associated drive shaft for movement along said path, cooperating means on said latch and said drive shaft for releasably engaging said latch to said drive shaft, means on said drive shaft for locking said latch in an engaged position with said drive shaft, a stop member at a predetermined position along said path, an actuator linkage engaging said locking means and engageable with said stop member at said predetermined position to disengage said locking means.

9. In a neutronic reactor having a plurality of fuel assemblies and a plurality of control rods insertable among selected groups of said fuel assemblies, a releasable coupling mechanism for each of said control rods and comprising a drive shaft movable along a prescribed path, each control rod being disposed adjacent to its associated drive shaft for movement along said path, a stop member at a predetermined position along said path, at least one latch pivotally secured to each of said control rods, a catch on one end of said drive shaft and adjacent to said control rod, a lock on said drive shaft, and a lock actuator slidably disposed through a portion of said drive shaft adjacent said control rod and affixed to said lock, said lock actuator being positioned to engage said stop at said predetermined position to engage and to disengage said lock and said latch to prevent and to permit disengagement of said catch and said latch, respectively.

10. In a neutronic reactor having a plurality of fuel assemblies and a plurality of cruciformly shaped control rods insertable among selected groups of said fuel assemblies, a releasable coupling mechanism for each of said control rods and comprising a substantially upright drive shaft disposed directly below an associated one of said control rods, at least one latch pivotally secured to said control rod, camming surfaces on said latch and on the adjacent end of said drive shaft for engaging said drive shaft by a pivotal movement of said latch, means for locking said latch in an engaged position with said drive shaft, and additional means for disengaging said locking means only when said control rod is in a fully inserted position among said fuel assemblies.

11. In a neutronic reactor having a plurality of fuel assemblies and a plurality of cruciformly shaped control rods insertable among selected groups of said fuel assemblies, a releasable coupling mechanism for each of said control rods and comprising a substantially upright drive shaft disposed directly below an associated one of said control rods, at least one latch pivotally secured to said control rods, camming surfaces on said latch and on the adjacent end of said drive shaft for engaging said drive shaft by a pivotal movement of said latch, means for locking said latch in an engaged position with said drive shaft, additional means for disengaging said locking means only when said control rod is in a fully inserted position among said fuel assemblies, and additional camming surfaces on said latch for pivotally passing said latch by said drive shaft and by said locking means.

12. In a neutronic reactor having a plurality of fuel assemblies and a plurality of cruciformly shaped control rods each having a plurality of blades insertable among selected groups of said fuel assemblies, a releasable coupling mechanism for each of said control rods and comprising a drive shaft having a shoulder near one end engageable with an associated one of said control rods, a finger pivotally secured to at least one of said control rod blades, cooperating means on said finger and on one end of said drive shaft for engaging said finger to said drive shaft, means for locking said finger in an engaged position with said drive shaft, said engaged finger being utilized to move said control rod in one direction and said shoulder on said drive shaft being utilized to move said control rod in the other direction, means for disengaging said locking means only when said control rod is in a fully inserted position among said fuel assemblies, and means for pivotally passing said finger by said drive shaft and by said locking means to disengage completely said control rod from said drive shaft.

13. A releasable coupling mechanism comprising a driving member, a driven member disposed adjacent and above said driving member for movement therewith, at least one latch pivotally secured to said driven member, cooperating means on said latch and on said driving member for releasably engaging said latch to said driving member, means for locking said latch in an engaged position with said driving member, a stop element adjacent the lowermost position of said driven member, and means engageable with said stop element for unlocking said latch from said driving member at the bottom position of said driving member so as to permit removal of said driven member from above.

14. A releasable coupling mechanism comprising a driving member movable along a substantially vertical path, a driven member disposed adjacent and above said driving member for movement along said path, a stop member below said driven member at a predetermined position along said path, at least one latch pivotally secured to said driven member, a catch formed at the end of said driving member and adjacent said driven member, a locking element disposed adjacent and above said catch and locking said latch in an engaged position with said catch, and an actuator slidably disposed through a portion of said driving member and spring biased in a downwardly direction, said actuator being affixed to said locking element and positioned to engage said stop member at said predetermined position to disengage said locking element from said latch to permit disengagement of said latch from said catch.

15. A releasable coupling mechanism comprising a driving member, a driven member disposed above and adjacent said driving member for movement therewith, at least one latch pivotally secured to said driven member, cooperating means on said latch and on said driving member for releasably engaging said latch to said driving member, means for locking said latch in an engaged position with said driving member, an enclosure surrounding said driving member and said driven member, and means within said enclosure operative at a predetermined position for unlocking said locking means from said latch.

16. In a neutronic reactor having a plurality of fuel assemblies and a plurality of control rods each having at least one blade inserted among selected groups of said fuel assemblies, a releasable coupling mechanism for each of said control rods and comprising a drive shaft, a latch pivotally secured to said control rod blade, cooperating means for engaging said latch to one end of said drive shaft, a stop element adjacent said drive shaft when said drive shaft is at one end of its travel, and means engageable with said stop element for disengaging said locking means when said control rod is in a fully inserted position among said fuel assemblies.

References Cited by the Examiner

FOREIGN PATENTS 834,365    5/60    Great Britain.

CARL D. QUARFORTH, *Primary Examiner.*